US007631052B2

(12) United States Patent
Fein et al.

(10) Patent No.: US 7,631,052 B2
(45) Date of Patent: *Dec. 8, 2009

(54) REDUNDANT DATA FORWARDING STORAGE

(76) Inventors: Gene Fein, 29712 Zuma Bay Way, Mailibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 0 days.

This patent is subject to a terminal disclaimer.

(21) Appl. No.: 12/132,804

(22) Filed: Jun. 4, 2008

(65) Prior Publication Data

US 2009/0240782 A1   Sep. 24, 2009

Related U.S. Application Data

(63) Continuation of application No. 12/052,345, filed on Mar. 20, 2008.

(51) Int. Cl.
*G06F 15/167* (2006.01)
*G06F 15/173* (2006.01)
(52) U.S. Cl. .................. 709/216; 709/238; 709/239
(58) Field of Classification Search ................ 709/251, 709/216, 238, 239; 710/100
See application file for complete search history.

(56) References Cited

U.S. PATENT DOCUMENTS

| 5,787,258 | A | * | 7/1998 | Costa et al. ................ 709/251 |
| 6,151,395 | A | * | 11/2000 | Harkins ....................... 380/286 |
| 6,260,159 | B1 | | 7/2001 | Garnett et al. |
| 6,505,213 | B1 | | 1/2003 | Kamada et al. |
| 6,684,258 | B1 | * | 1/2004 | Gavin et al. ................. 709/251 |
| 6,745,289 | B2 | | 6/2004 | Gruner et al. |
| 7,061,923 | B2 | | 6/2006 | Dugan et al. ................ 370/396 |
| 7,103,824 | B2 | | 9/2006 | Halford |
| 7,120,631 | B1 | | 10/2006 | Vahalia et al. ................ 707/10 |
| 7,143,170 | B2 | * | 11/2006 | Swildens et al. ............ 709/226 |
| 7,191,298 | B2 | | 3/2007 | Kaminsky et al. ........... 711/162 |

(Continued)

FOREIGN PATENT DOCUMENTS

EP       1 048 998        11/2000

(Continued)

OTHER PUBLICATIONS

Tsutomu Akasaka, "Remote Copy Technology of ETERNUS6000 and ETERNUS3000 Disk Arrays," Fujitsu Sci. Tech. J., 42.1, pp. 9-16, Jan. 2006.

(Continued)

*Primary Examiner*—J Bret Dennison
(74) *Attorney, Agent, or Firm*—Knobbe, Martens, Olson & Bear LLP

(57) ABSTRACT

Methods and apparatus, including computer program products, for redundant data forwarding storage. A method includes, in two or more networks of interconnected computer system nodes, receiving a request from a source system in a first network to store data, directing the data to a first computer memory in a first network, directing a first copy of the data to a second computer memory in a second network, continuously forwarding the data from the first computer memory to other computer memories in the first network without storing on any physical storage device in the first network, and continuously forwarding the first copy of the data from the second computer memory to other computer memories in the second network without storing on any physical storage device in the second network.

18 Claims, 5 Drawing Sheets

U.S. PATENT DOCUMENTS

| | | | |
|---|---|---|---|
| 7,277,941 B2 | 10/2007 | Ignatius et al. | |
| 7,327,731 B1 | 2/2008 | Kumar et al. | 370/390 |
| 7,404,002 B1* | 7/2008 | Pereira | 709/231 |
| 7,430,584 B1 | 9/2008 | Fein et al. | |
| 2002/0194371 A1* | 12/2002 | Kadoi | 709/239 |
| 2003/0158958 A1 | 8/2003 | Chiu | |
| 2004/0064633 A1 | 4/2004 | Oota | |
| 2004/0223503 A1* | 11/2004 | Lynch et al. | 370/404 |
| 2005/0201409 A1* | 9/2005 | Griswold et al. | 370/445 |
| 2005/0243823 A1* | 11/2005 | Griswold et al. | 370/389 |
| 2006/0031593 A1* | 2/2006 | Sinclair | 709/251 |
| 2006/0090017 A1 | 4/2006 | Kim et al. | |
| 2006/0143505 A1 | 6/2006 | Olarig | |
| 2006/0242212 A1 | 10/2006 | Brinkmann et al. | 17/30 |
| 2007/0073965 A1 | 3/2007 | Rajakarunanayake | |
| 2007/0186068 A1 | 8/2007 | Agrawal | 711/162 |
| 2007/0195772 A1* | 8/2007 | Shadish | 370/390 |
| 2008/0013448 A1 | 1/2008 | Horie et al. | |
| 2008/0037777 A1 | 2/2008 | Ignatius et al. | |
| 2008/0071855 A1 | 3/2008 | Farber et al. | |
| 2009/0006808 A1 | 1/2009 | Blumrich et al. | |
| 2009/0067322 A1* | 3/2009 | Shand et al. | 370/225 |

FOREIGN PATENT DOCUMENTS

| | | | |
|---|---|---|---|
| EP | 1406446 A1 | 4/2004 | 7/167 |
| EP | 1322068 B1 | 11/2006 | 12/24 |
| EP | 1798934 A1 | 6/2007 | |
| EP | 1798937 A1 | 6/2007 | 29/8 |
| EP | 1826968 A1 | 8/2007 | 12/64 |
| EP | 1485787 B1 | 10/2007 | 11/20 |
| EP | 1776639 B1 | 12/2007 | |
| EP | 1776639 B2 | 12/2007 | 11/20 |
| EP | 1479236 B1 | 1/2008 | 7/173 |
| JP | 2002-268952 | 9/2002 | |
| WO | WO 02/052417 | 7/2002 | |
| WO | WO 2006/124217 | 11/2006 | |

OTHER PUBLICATIONS

Cheeha Kim, "An Efficient Multicast Data Forwarding Scheme For Mobile Ad Hoc Networks," Information Networking, Convergence in Broadband and Mobile Networking, International Conference, ICOIN 2005.

Ertaul et. al., "Implementation of Homomorphic Encryption Schemes For Secure Packet Forwarding in Mobile Ad Hoc Networks (MANETs)," IJCSNS, vol. 7, No. 11, pp. 132-141, Nov. 2007.

Ertaul et. al., "ECC Based Threshold Cryptography for Secure Data Forwarding and Secure Key Exchange in MANET (I)," Networking 2005, LNCS 3462, pp. 102-113, 2005.

Huang et. al., "Secure Data Forwarding in Wireless Ad Hoc Networks," IEEE International Conference, pp. 3525-3531, 2005.

Ito, et al., "Technologies of ETERNUSVS900 Storage Virtualization Switch," Fujitsu Sci. Tech. J., 42.1 pp. 17-23, Jan. 2006.

Komandur et. al., "SPAM: A Data Forwarding Model for Multipoint-to-Multipoint Connection Support in ATM Networks," $IC^3N$, IEEE Computer Society, pp. 1-7, Sep. 1997.

Lusheng Ji et. al., "On Providing Secure and Portable Wireless Data Networking Services: Architecture and Data Forwarding Mechanisms," IPSJ Journal, vol. 45 , No. 10, pp. 2261-2269, Oct. 2004.

International Search Report and Written Opinion, PCT/US2009/037579, dated Jun. 24, 2009, 12 pgs.

* cited by examiner ically, an Ethernet network) and assigned an IP address. File
REDUNDANT DATA FORWARDING STORAGE

CROSS-REFERENCE TO RELATED APPLICATIONS

This application is a continuation of U.S. application Ser. No. 12/052,345, filed Mar. 20, 2008, titled "Redundant Data Forwarding Storage," herein incorporated by reference in its entirety.

BACKGROUND

At least some embodiments disclosed herein relate to data storage, and more particularly, to redundant data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for redundant data forwarding storage.

In general, in one aspect, the invention features a method including, in two or more networks of interconnected computer system nodes, receiving a request from a source system in a first network to store data, directing the data to a first computer memory in a first network, directing a first copy of the data to a second computer memory in a second network, continuously forwarding the data from the first computer memory to other computer memories in the first network without storing on any physical storage device in the first network, and continuously forwarding the first copy of the data from the second computer memory to other computer memories in the second network without storing on any physical storage device in the second network.

In another aspect, the invention features a system including, at least two networks wherein computer system nodes are each adapted to receive data and copies of data and continuously forward the data and copies of data from computer memory to computer memory without storing on any physical storage device in response to a request to store data from a requesting system.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous redundant data forwarding system, i.e., data and copies of data are stored by continually forwarding it from one node memory to another node memory. Copies of data may continuously forwarded in one or more networks.

Figure 1:
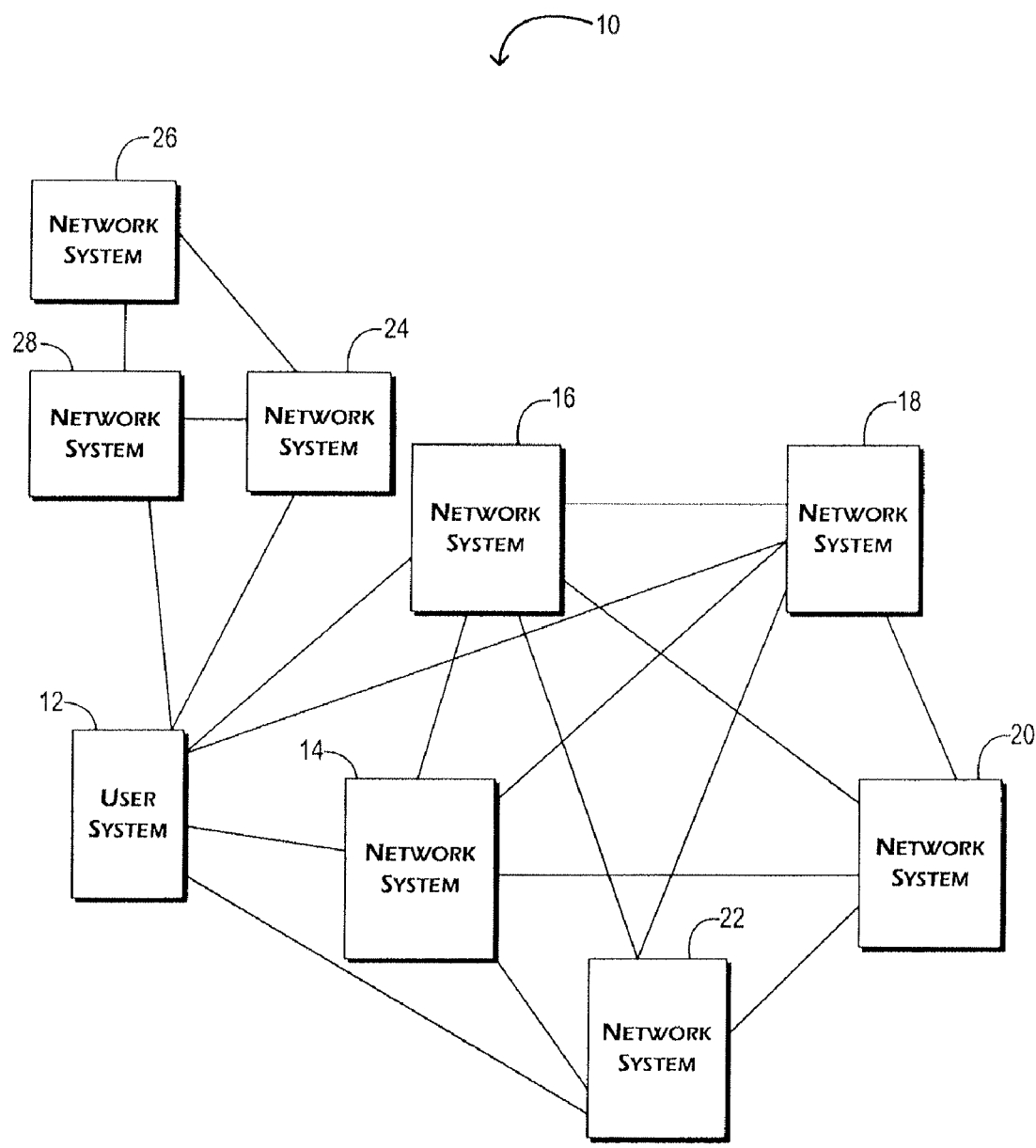
FIG. 1 is a block diagram of an exemplary system.

As shown in FIG. 1, an exemplary system 10 includes a user system 12 and a number of network systems 14, 16, 18, 20, 22. Each of the network systems 14, 16, 18, 20, 22 can be considered to be a node in the system 10 and one such network system may be designated as a central server, such as network system 14, which may assume a control position in system 10. Each of the nodes 14, 16, 18, 20, 22 may be established as a privately controlled network of peers under direct control of the central server 14. Peered nodes may also be a mix of private and public nodes, and thus not under the direct physical control of the central server 14. The system 10 may also be wholly public where the central server 14 (or servers) has no direct ownership or direct physical control of any of the peered nodes.

In one example, nodes 14, 16, 18, 20 and 22 can be considered a private network. In a private network, an administrator controls the nodes and may designate which node is the central server. The system 10 can also include one or more additional nodes. For example, nodes 24, 26 and 28. These nodes 24, 26 and 28 may be considered to be part of one or more public networks in which the administrator has little or no control.

Figure 2:
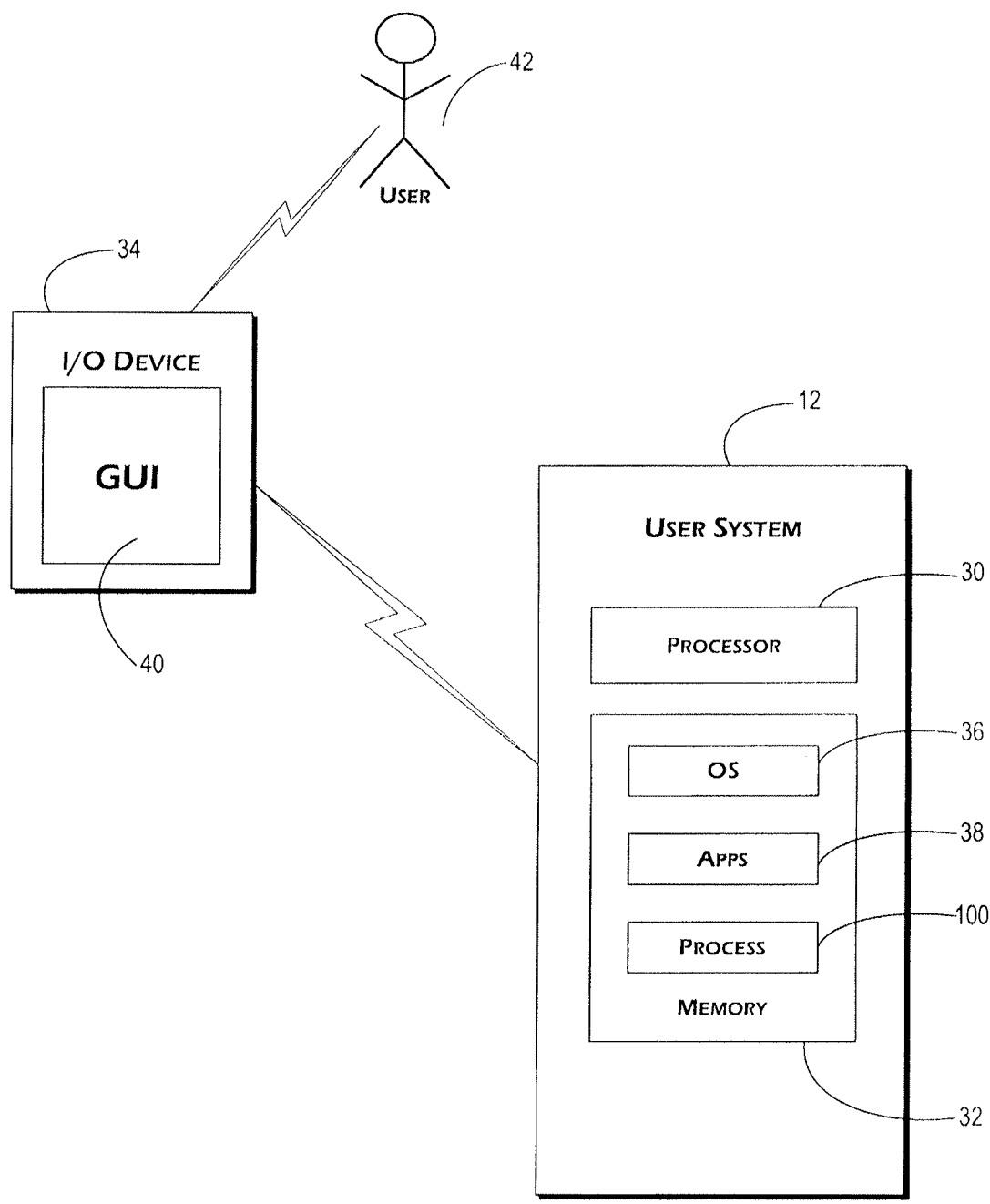
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
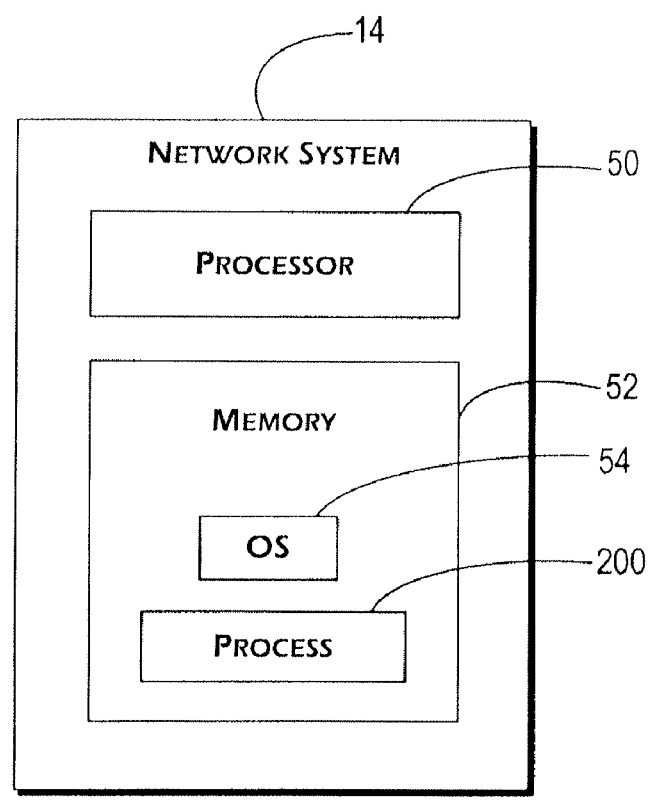
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices, and copies of data, which are used to provide redundancy, are stored locally or on remote physical storage devices such as disk drives. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data and does not use physical data storage to provide data redundancy. When a request to store data is received by the central server 14 from storage process 100, data is directed to a node in the system 10 where it is then continuously forwarded from node memory to node memory in the system 10 by the data forwarding process 200 in each of the network nodes without storing on any physical storage medium such as a disk drive. The request to store data makes at least one copy of the data, which is directed to a node in a secondary private or public network, or directed to nodes on more than one network, where it too is continuously forwarded from node memory to node memory in the secondary private or public network. The forwarded data resides only for a very brief period of time in the memory of any one node in the system 10. Data and copies of data are not stored on any physical storage medium in any network node.

When a request to retrieve data is received by the central server 14 from storage process 100, the requested data, which is being forwarded from node memory to node memory in the system 10, is retrieved.

Data forwarded in this manner can be segmented and segments forwarded as described above. Still, the segmented data is not stored on any physical storage medium in any network node, but merely forwarded from the memory of one node to the memory of another node.

Figure 4:
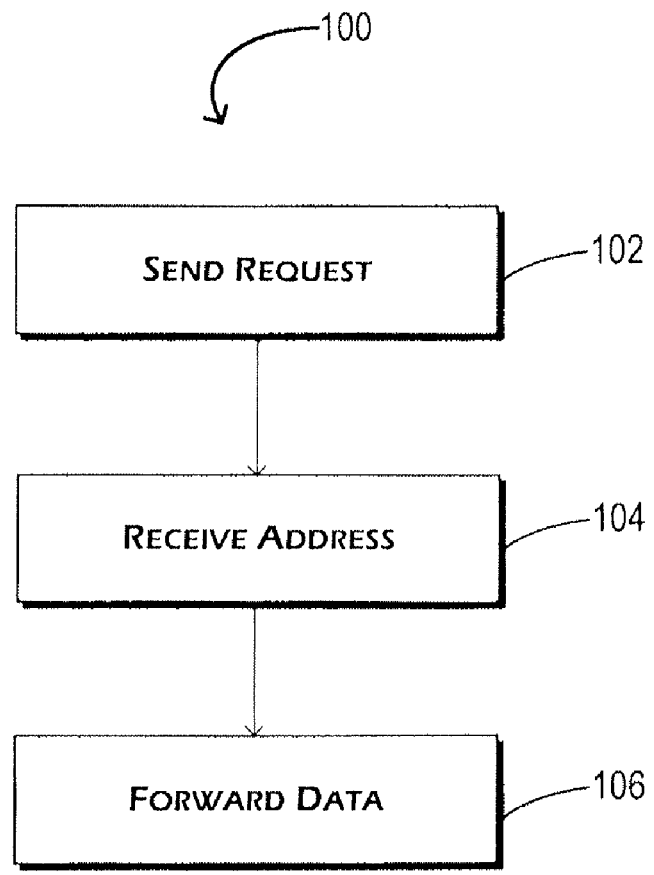
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) first address of a node and a second address of a node from the central server 14 and forwards (106) the data to the node memory represented by the received first address and a copy of the data to the node memory represented by the received second address.

Figure 5:
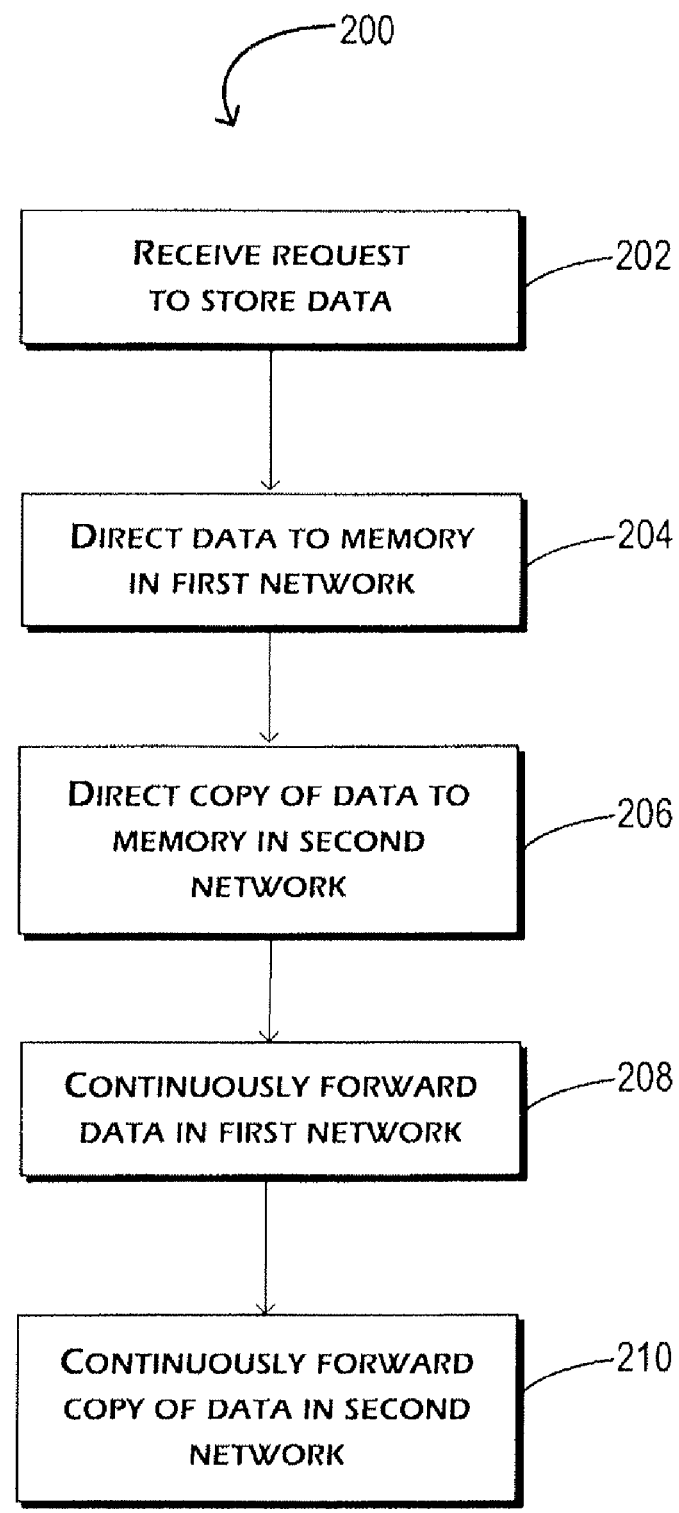
FIG. 5 is a flow diagram of a process.

As shown in FIG. 5, data forwarding process 200 includes receiving (202) a request from a source system in a first network to store data.

Process 200 directs (204) the data to the first computer memory in a first network and directs (206) a first copy of the data to a second computer memory in a second network. Directing (206) may be to node memories in one or more networks, both private and/or public.

Process 200 continuously forwards (208) the data from the first computer memory to other computer memories in the first network without storing on any physical storage device in the first network.

Continuously forwarding (208) includes detecting a presence of the data in memory of the specific node of the first network and forwarding the data to another computer memory of a node in the first network of interconnected computer system nodes without storing any physical storage device.

Process 200 continuously forwards (210) the first copy of the data from the second computer memory to other computer memories in the second network without storing on any physical storage device in the second network.

Continuously forwarding (210) includes detecting a presence of the first copy of data in memory of the specific node of the second network, and forwarding the first copy of the data to another computer memory of a node in the second network of interconnected computer system nodes without storing any physical storage device.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

New nodes and node states may be added and/or deleted from the system 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the system 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data and copies of data are passed, routed, forwarded from node memory to node memory. The data and copies of data are never downloaded until the authorized user calls for the data. A user on the system may authorize more than one user to have access to the data.

A primary goal in process 200 is to generate a redundant data storage and management system where the redundant data is never fixed in physical storage, but in fact, is continually being routed/forwarded from node memory to node memory. The path of the nodes to which redundant data is forwarded may also be altered by the central server 14 to adjust for system capacities and to eliminate redundant paths of data that may weaken the security of the network due to the increased probability of data path without this feature.

The invention can be implemented to realize one or more of the following advantages. One or more networks create redundant data storage without caching or downloads. Redundant data storage and management are accomplished via a constant routing of the redundant data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
   in two or more networks of interconnected computing devices, receiving a request from a source computing system to store data;
   directing the data to a first computer random access memory associated with a first computing device in a first network;
   directing a first copy of the data to a second computer random access memory associated with a second computing device in a second network;
   continuously forwarding the data among random access memories of respective computing devices in the first network without storing the data on any hard drive in the first network;
   continuously forwarding the first copy of the data among random access memories of respective computing devices in the second network without storing the first copy of the data on any hard drive in the second network; and
   requesting the data from one or more random access memories in the first network or requesting the first copy of the data from one or more random access memories in the second network.

2. The method of claim 1 further comprising:
   directing a second copy of the data to a third computer random access memory associated with a third computing device in a third network of interconnected computing devices; and
   continuously forwarding the second copy of the data among random access memories of respective computing devices in the third network without storing the second copy of the data on any hard drive in the third network.

3. The method of claim 1 wherein each of the networks comprise one or more of a private network and a public network.

4. The method of claim 1 wherein continuously forwarding comprises:
   determining an address of a computing device available in the first network to receive the data based on one or more factors;
   determining an address of a computing device available in the second network to receive the first copy of the data based on one or more factors;
   sending to a central server device the address of the available computing device in the first network and the address of the available computing device in the second network; and
   applying a time stamp to the data in a computer random access memory of the available computing device in the first network and to the first copy of the data in a computer random access memory of the available computing device in the second network.

5. The method of claim 4 wherein the one or more factors comprise network traffic analysis and available memory.

6. The method of claim 4 wherein continuously forwarding further comprises:
   detecting a presence of the data in a computer random access memory of a specific computing device of the first network;
   forwarding the data to the computer random access memory of the available computing device in the first network without storing the data on any hard drive in the first network;
   detecting a presence of the first copy of the data in a computer random access memory of a specific computing device of the second network; and
   forwarding the first copy of the data to the computer random access memory of the available computing device in the second network without storing the first copy of the data on any hard drive in the second network.

7. The method of claim 3 wherein the first copy of the data is directed to a private network selected by a user or user application.

8. A tangible machine readable storage device having computer-executable instructions stored thereon, the computer-executable instructions readable by a computing system comprising one or more computing devices, wherein the computer-executable instructions are executable on the computing system in order to cause the computing system to perform a method comprising:

receiving a request from a source computing system to store data;

directing the data to a first computer random access memory associated with a first computer system node in a first network;

directing a first copy of the data to a second computer random access memory associated with a second computer system node in a second network;

initiating continuous forwarding of the data among computer random access memories of respective computer system nodes in the first network without storing the data on any hard drive in the first network;

initiating continuous forwarding of the first copy of the data among computer random access memories of respective computer system nodes in the second network without storing the first copy of the data on any hard drive in the second network; and requesting the data from one or more random access memories in the first network or requesting the first copy of the data from one or more random access memories in the second network.

9. The tangible machine readable storage device of claim 8, wherein the method further comprises:

directing a second copy of the data to a third computer random access memory in a third network of interconnected computer devices; and continuously forwarding the second copy of the data among computer random access memories of respective computer system nodes in the third network without storing the second copy of the data on any hard drive in the third network.

10. The tangible machine readable storage device of claim 8, wherein each of the networks comprise one or more of a private network and a public network.

11. The tangible machine readable storage device of claim 8, wherein continuously forwarding comprises:

determining an address of a third computer system node available in the first network to receive the data based on one or more factors; and determining an address of a fourth computer system node available in the second network to receive the first copy of the data based on one or more factors.

12. The tangible machine readable storage device of claim 11 wherein the one or more factors comprise network traffic analysis and available memory.

13. The tangible machine readable storage device of claim 11 wherein continuously forwarding further comprises:

detecting a presence of the data in a computer random access memory associated with a specific computer system node of the first network;

forwarding the data to a computer random access memory associated with the available computer system node in the first network without storing the data on any hard drive in the first network;

detecting a presence of the first copy of the data in a computer random access memory associated with a specific computer system node of the second network; and forwarding the first copy of the data to a computer random access memory associated with the available computer system node in the second network without storing the first copy of the data on any hard drive in the second network.

14. The tangible machine readable storage device of claim 10 wherein the first copy of the data is directed to a private network selected by a user or user application.

15. A system comprising:

a first network comprising computer system nodes, wherein each computer system node is adapted to
receive data in a random access memory; and
after receiving the data from another computer system node,
forward the data to at least one other computer random access memory associated with another computer system node without storing the data on any hard drive associated with the computer system node if a request to transmit the data to a requesting computing device has not been received; or
transmit the data from the random access memory of the computer system node to a requesting computing device in response to receiving a request for the data; and a second network comprising computer system nodes, wherein each computer system node is adapted to
receive a copy of the data in a random access memory; and
after receiving the copy of the data from another computer system node,
forward the copy of the data to at least one other computer random access memory associated with another computer system node without storing the copy of the data on any hard drive associated with the computer system node; or
transmit the copy of the data from the random access memory of the computer system node to a requesting computing device in response to receiving a request for the copy of data.

16. The system of claim 15 wherein each computer system node is further adapted to
detect a presence of the data or a copy of the data in its random access memory,
apply a time stamp to the data or the copy of the data, and
forward the data or the copy of the data to a random access memory of another computer system node in the respective network according to a nodes the availability of the another computer system node.

17. The system of claim 16 wherein the availability of the another computer system node is determined according to its volume of network traffic.

18. The system of claim 17 wherein each computer system node encrypts the data or the copy of the data.

* * * * *